(12) United States Patent
Villiger (10) Patent No.: US 10,723,550 B2
(45) Date of Patent: Jul. 28, 2020

(54) LIFTING DEVICE ON A LORRY

(71) Applicant: Villiger Public-Systems GmbH, Oberrüti (CH)

(72) Inventor: Paul Villiger, Oberrüti (CH)

(73) Assignee: Villiger Public Systems GmbH, Oberruti (CH)

( * ) Notice: Subject to any disclaimer, the term of this patent is extended or adjusted under 35 U.S.C. 154(b) by 147 days.

(21) Appl. No.: 15/301,706

(22) PCT Filed: Mar. 18, 2015

(86) PCT No.: PCT/IB2015/051980
§ 371 (c)(1),
(2) Date: Mar. 13, 2017

(87) PCT Pub. No.: WO2015/150956
PCT Pub. Date: Oct. 8, 2015

(65) Prior Publication Data
US 2017/0183152 A1   Jun. 29, 2017

(30) Foreign Application Priority Data
Apr. 4, 2014   (CH) .......................................... 528/14

(51) Int. Cl.
*B65F 3/02* (2006.01)
*B60P 1/54* (2006.01)
(Continued)

(52) U.S. Cl.
CPC .......... *B65F 3/0203* (2013.01); *B60P 1/5433* (2013.01); *B66C 23/16* (2013.01); *B66C 23/701* (2013.01); *B65F 2003/0266* (2013.01)

(58) Field of Classification Search
CPC ..... B60P 1/5433; B60P 1/5419; B60P 1/5452; B60P 1/5466; B60P 1/548; B60P 1/5495;
(Continued)

(56) References Cited

U.S. PATENT DOCUMENTS 2,933,210 A    4/1960   Dye
3,301,416 A *  1/1967   Bopp ..................... B66C 23/36
                                                        414/543
(Continued)

FOREIGN PATENT DOCUMENTS

EP   1 008 537 A1   6/2000
EP   1 084 069 B1   8/2002
(Continued)

OTHER PUBLICATIONS

European Patent Office, International Search Report, dated Jun. 25, 2015, 3 pages.
(Continued)

*Primary Examiner* — James Keenan
(74) *Attorney, Agent, or Firm* — Seed IP Law Group LLP (57) ABSTRACT

A lifting device on a heavy goods vehicle is described, for lifting and emptying waste collection containers, having a telescopically extensible boom, which has a coupling tool for coupling to a waste collection container. An extensible support is attached on a rotating platform and has at least one interleaved, telescopically extensible profile, wherein the boom is provided at the upper end of the support with a pivot element between boom and support, so that the boom is pivotable in a vertical plane about a pivot axis. The extensible profile is designed as an internal runner having a fixed tube and runners having a polygonal footprint, and a carrier head is provided at the end of the support, which is formed as L-shaped having an overhanging carrier plate in relation to the support, which carrier plate has the pivot axis of the boom and a support for the pivot element.

10 Claims, 9 Drawing Sheets

(51) Int. Cl.
*B66C 23/16* (2006.01)
*B66C 23/70* (2006.01)

(58) Field of Classification Search
CPC ............ B65F 3/0203; B65F 2003/0266; B65F 2003/0273; B65F 2003/0283; B66C 23/16
USPC ................................ 212/204, 296, 348–350
See application file for complete search history.

(56) References Cited

U.S. PATENT DOCUMENTS

| | | | | |
|---|---|---|---|---|
| 3,944,081 | A * | 3/1976 | Wellman | B66C 23/34 212/296 |
| 4,357,785 | A * | 11/1982 | Eklund | E04H 12/182 212/350 |
| 4,540,096 | A * | 9/1985 | Orvis | B66F 9/061 212/177 |
| 4,596,336 | A * | 6/1986 | Zwagerman | B66C 23/701 212/199 |
| 4,616,225 | A * | 10/1986 | Woudenberg | E01F 9/662 116/63 P |
| 4,691,805 | A * | 9/1987 | Kishi | B66F 11/046 182/2.11 |
| 5,064,334 | A * | 11/1991 | Cooley | B66C 1/24 212/238 |
| 5,431,526 | A * | 7/1995 | Peterson | B60P 1/5433 212/223 |
| 5,445,281 | A * | 8/1995 | Hung | B60P 1/5433 212/179 |
| 5,678,708 | A * | 10/1997 | Forsberg | B66C 23/705 212/230 |
| 6,056,252 | A * | 5/2000 | Johannsen | B65G 21/14 198/812 |
| 6,516,960 | B1 * | 2/2003 | Schlachter | B66C 23/705 212/270 |
| 8,276,326 | B2 * | 10/2012 | Lounis | B66F 11/00 212/199 |
| 8,375,649 | B2 * | 2/2013 | Grotz | B66F 7/28 212/348 |
| 8,549,812 | B1 * | 10/2013 | Peng | E04B 1/34305 212/348 |

FOREIGN PATENT DOCUMENTS

| | | |
|---|---|---|
| WO | 99/54237 A2 | 10/1999 |
| WO | 2012/032438 A1 | 3/2012 |
| WO | 2015/001401 A1 | 1/2015 |

OTHER PUBLICATIONS

European Patent Office, Written Opinion of the International Searching Authority; dated Oct. 8, 2015, 6 pages.

* cited by examiner

LIFTING DEVICE ON A LORRY

BACKGROUND

Technical Field

The disclosure relates to a lifting device on a heavy goods vehicle for lifting and emptying waste collection containers.

Description of the Related Art

Such a lifting device for handling and emptying waste collection containers is known, for example, from WO-A-2012/032438. The lifting device described therein has a coupling tool for coupling to a waste collection container, and is provided with a rotating platform and a support attached thereon for a telescopically extensible boom. The support has interleaved C profiles, which are telescopically displaceable. The boom is fastened on the free end region of the support so it is vertically pivotable about a pivot axis. Furthermore, a pivot cylinder is provided between the boom and the support, to move the boom into a specific pivot angle in relation to the horizontal.

The C profiles of this lifting device have oval openings to save weight, whereby the support of the above lifting device has a lower torsional stiffness. Furthermore, the construction of the suspension of the boom at the upper end of the telescopically extensible support is relatively weak. Possible oscillations of a waste collection container to be lifted can thus not be damped enough, whereby a greater risk of accidents exists.

BRIEF SUMMARY

It is the object of the present invention to improve a lifting device of the above-mentioned type so that the construction of the lifting device is substantially more stable and has greater torsional stiffness, to be able to absorb possible oscillations of a lifted waste collection container sufficiently and therefore to be able to greatly reduce the risk of accidents.

SUBJECT MATTER

This object is achieved by a lifting device on a heavy goods vehicle having features described herein.

The lifting device according to an embodiment of the present invention has the great advantage that, in addition to the advantages of the known lifting device, it has substantially greater stability due to great stiffness and enables secure and nonhazardous operation.

BRIEF DESCRIPTION OF THE SEVERAL VIEWS OF THE DRAWINGS

Further advantages of the invention will be appreciated from a review of the following description, in which embodiments of the invention are explained in greater detail on the basis of an exemplary embodiment illustrated in the schematic drawings. In the figures.

In the figures, the same elements are provided with the same reference signs, if not otherwise indicated.

DETAILED DESCRIPTION

Figure 1:
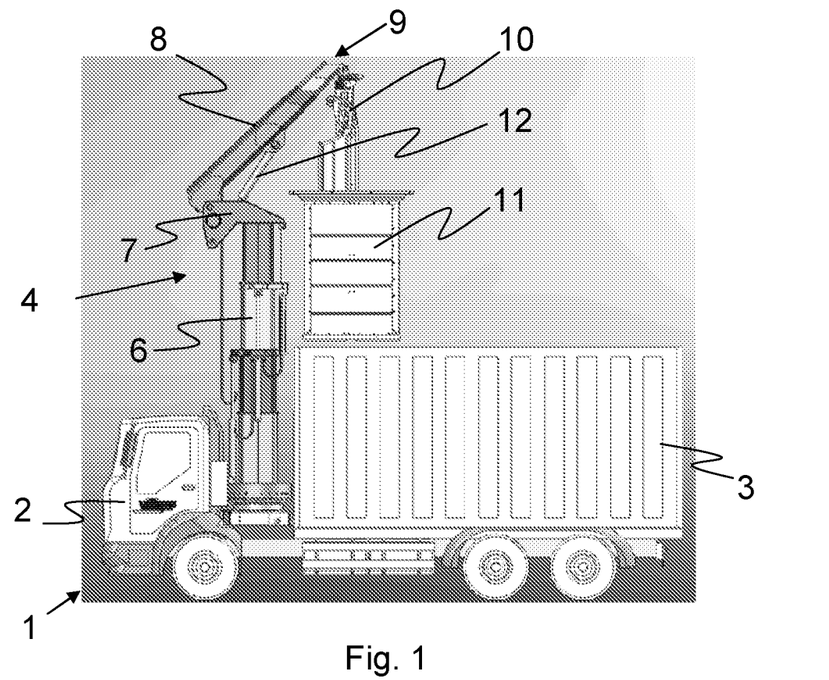
FIG. 1 shows a crane on a heavy goods vehicle in a top view.
Figure 2:
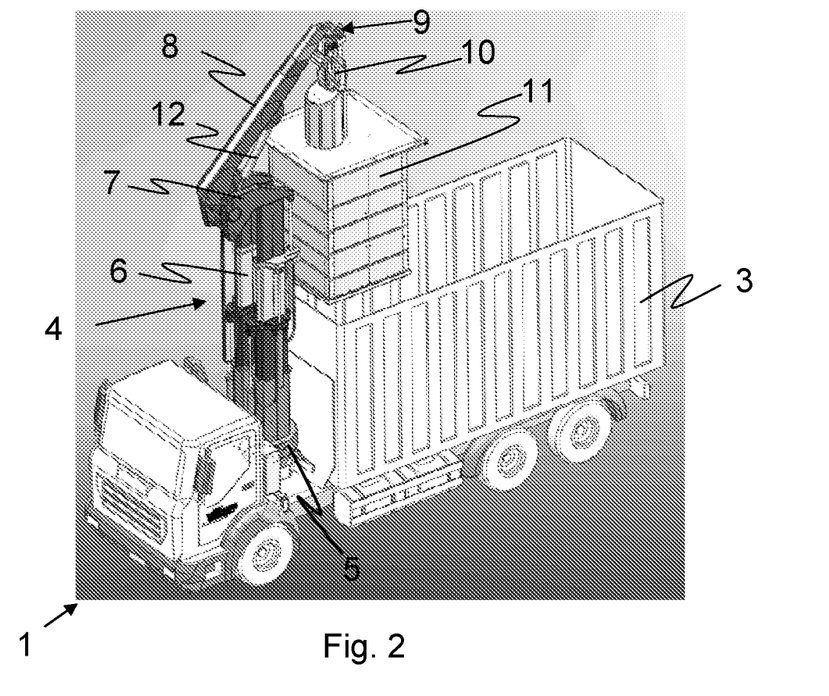
FIG. 2 shows the same crane of FIG. 1 in a perspective view.

FIGS. 1 and 2 show a heavy goods vehicle 1 having a cab 2 and a cargo space 3 for garbage. A lifting device or crane 4 on a rotating platform 5 is arranged between the cab 2 and the cargo space 3. The crane 4 has a telescopically extensible support 6, a carrier head 7, which is fastened on its upper end, having axis of rotation, and a telescopically extensible boom 8. A coupling tool 10, on which a waste collection container 11 is suspended, is arranged on the outer end 9 of the boom 8. A lifting element 12, which is designed as a pivot cylinder or as a knee lever mechanism and determines the vertical pivot angle between the carrier head 7 and the boom 8, is arranged between the carrier head 7 and the boom 8.

Figure 3:
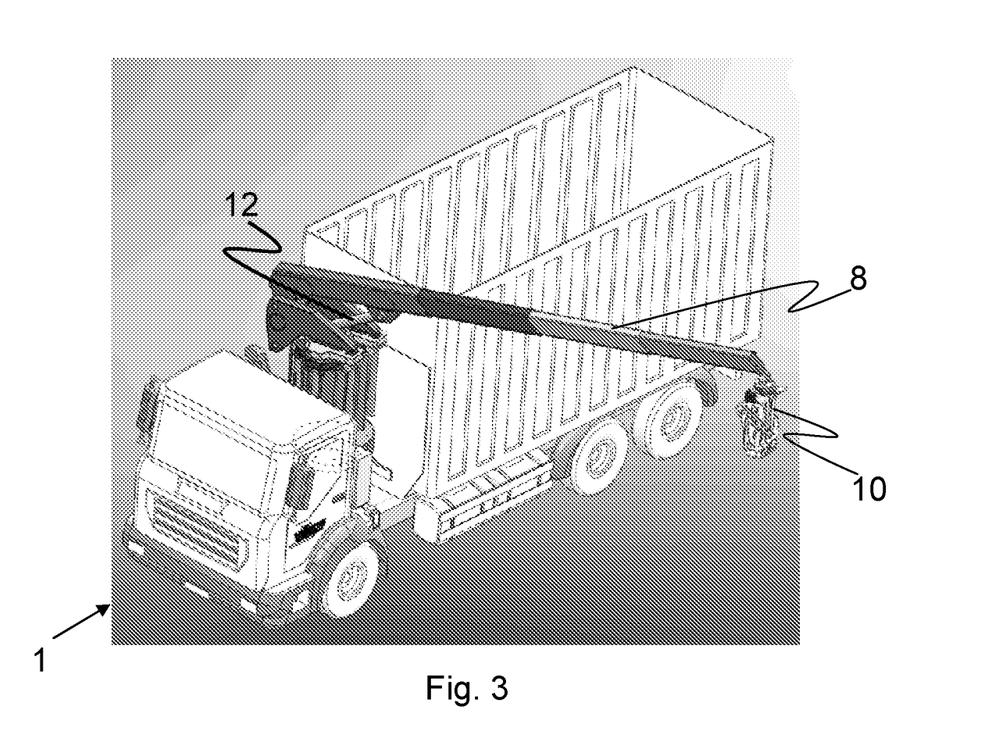
FIG. 3 shows the same crane as FIG. 1 in a first extended state.
Figure 4:
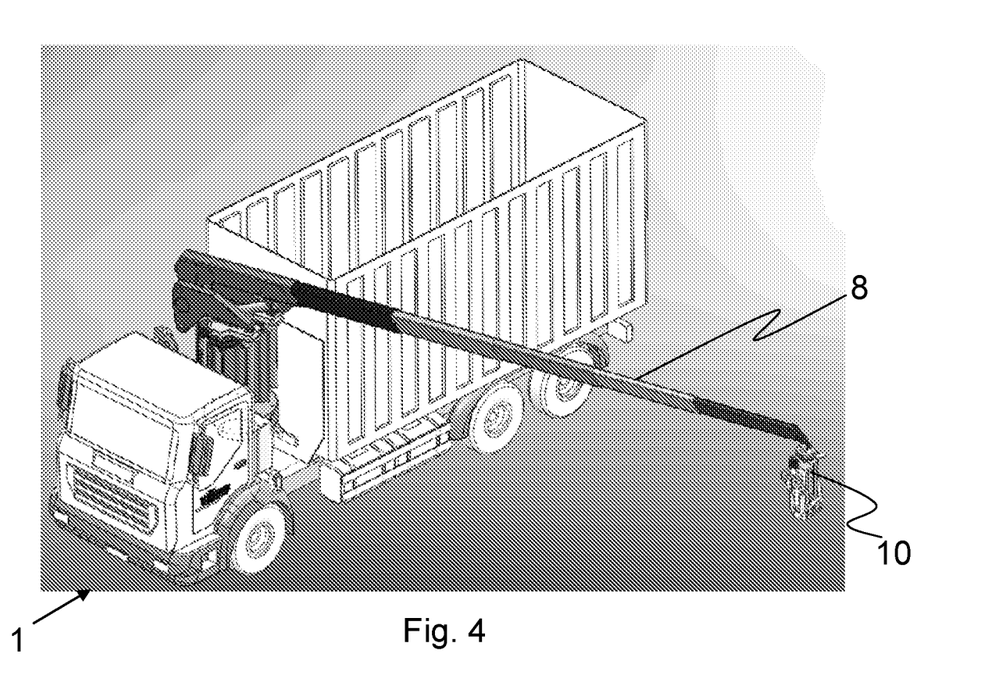
FIG. 4 shows the same crane as in FIG. 1 in a second extended state.

FIG. 3 shows the boom 8 in a first extended position and FIG. 4 shows it in a second, further extended position, wherein the boom 8 is approximately horizontal. The horizontal pivot angle is restricted in the collapsed state of the support 4 by the cargo space 3: on one side by the boom 8 and on the other side by the carrier head 7 having the hinged-on end of the boom 8.

Figure 5:
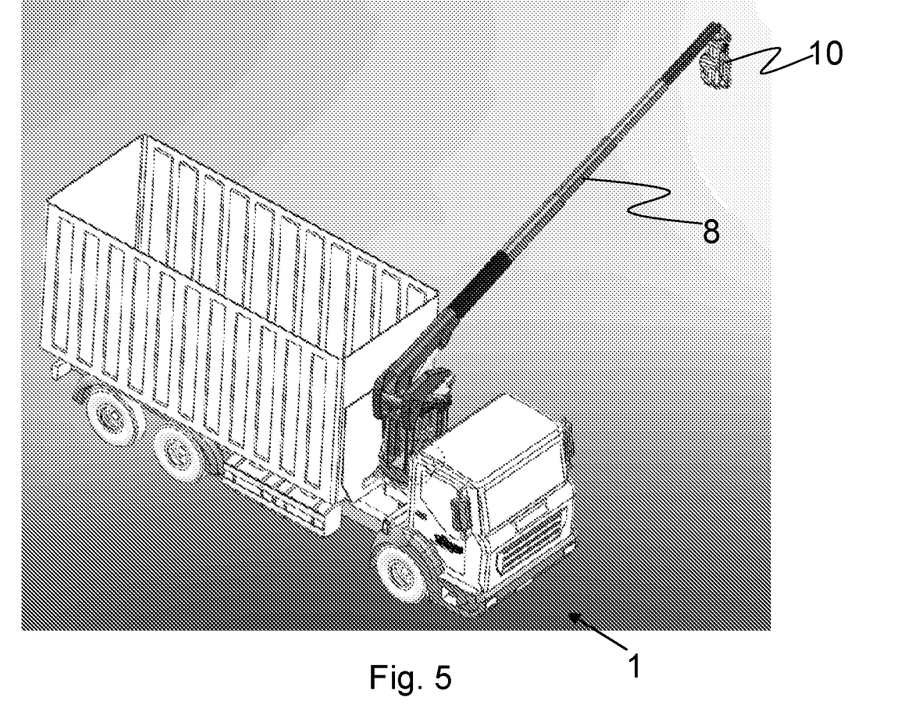
FIG. 5 shows the same crane as in FIG. 1, pivoted upward and extended.

FIG. 5 shows the boom 8 in the second, further extended position, wherein the vertical pivot angle has been enlarged by means of the pivot cylinder 12.

Figure 6:
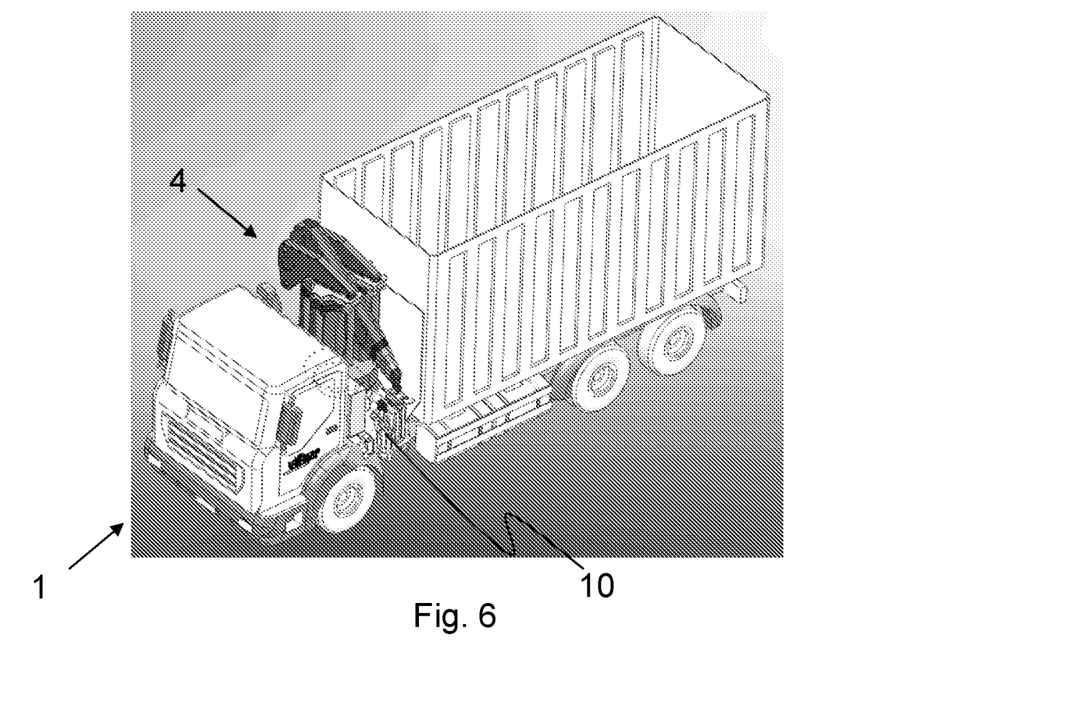
FIG. 6 shows the same crane as in FIG. 1 in the collapsed state.
Figure 10:
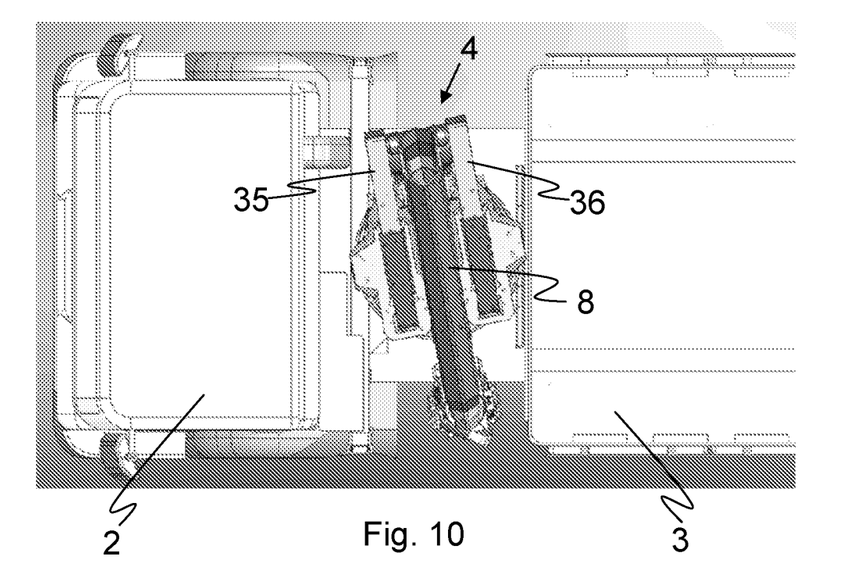
FIG. 10 shows a top view of the crane between the cab and the cargo space for garbage.

FIG. 6 shows the crane 4 in a very compact, collapsed state, so that the external contours of the crane 4 do not extend beyond the width of the cab 2 and the width of the cargo space 3. This is shown even more clearly in FIG. 10, in which the collapsed crane 4 is shown in a top view.

Figure 7:
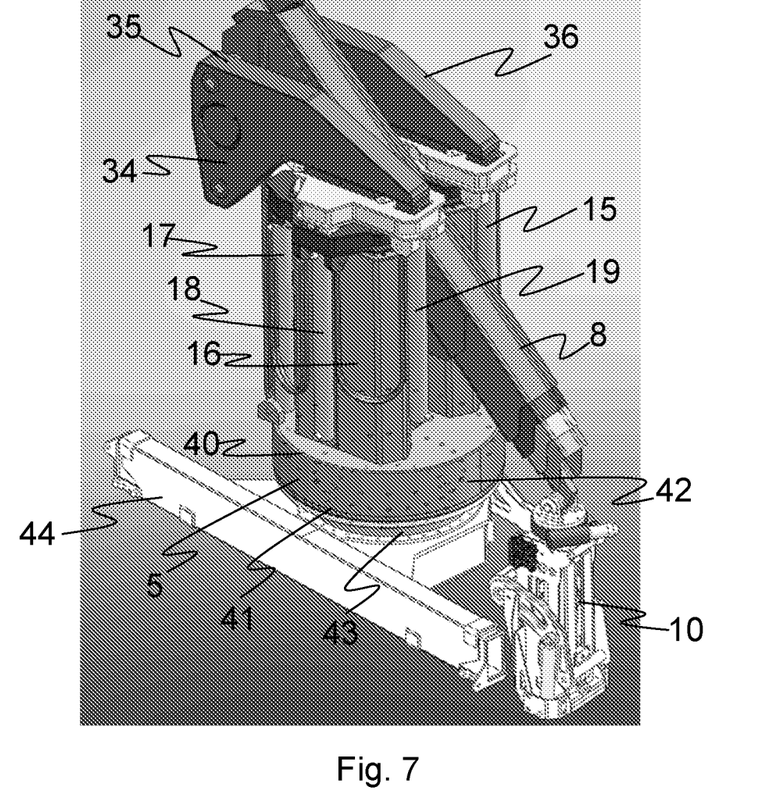
FIG. 7 shows an enlarged perspective view of the crane in the collapsed state.
Figure 8:
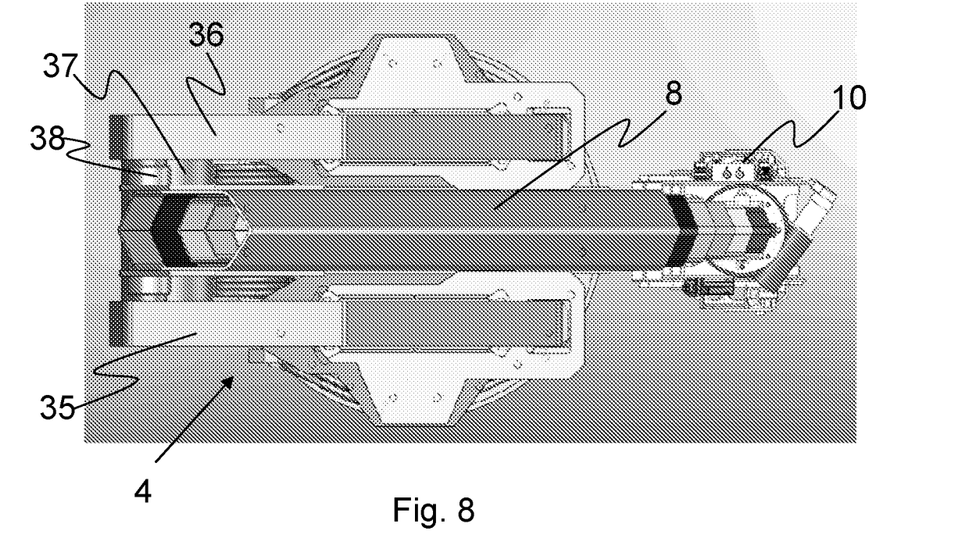
FIG. 8 shows a top view of the crane according to FIG. 7.
Figure 9:
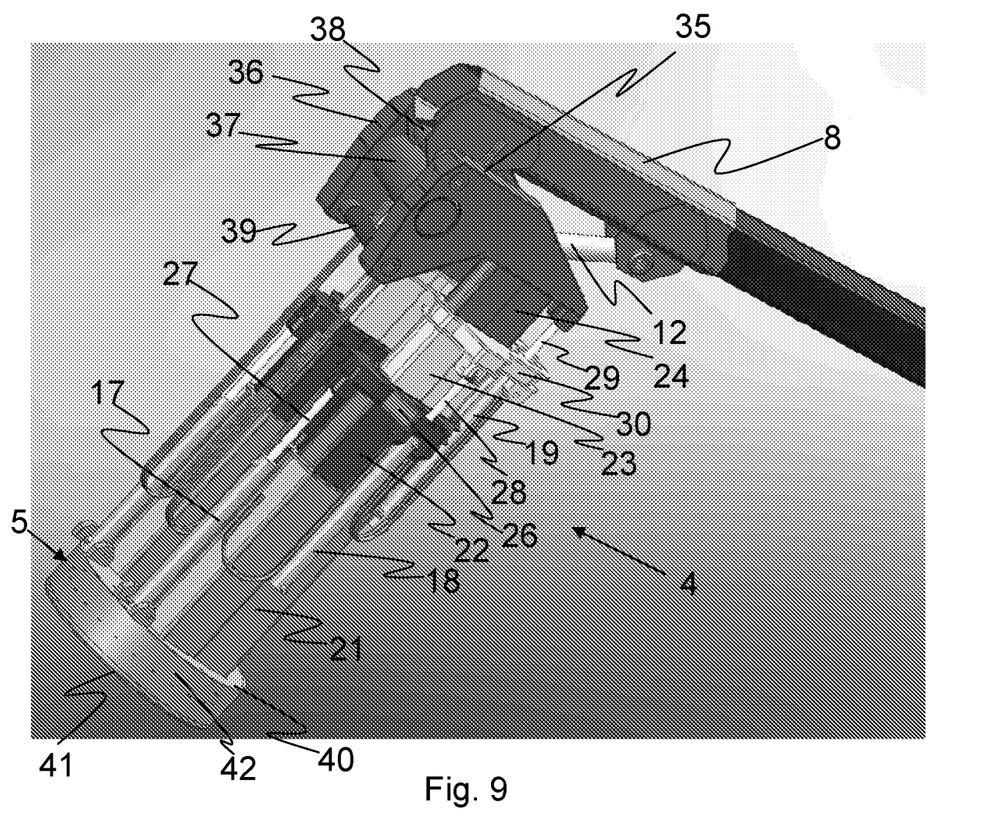
FIG. 9 shows an enlarged perspective view of the crane having slightly extended support.

The crane 4 is visible in larger details in FIGS. 7 to 9. The support 6 consists of two telescopically extensible, identically formed profiles or internal runners 15 and 16. The internal runners 15 and 16 can be raised by means of lifting cylinders 17, 18, and 19. As is apparent from FIG. 9, the internal runners 15 and 16 each consist of a fixed tube 21 and three runners 22, 23, and 24, which are telescopically displaceable one inside another. The second runner 22 has a first shoulder 26 on the upper end, against which the lifting rod 27 of the lifting cylinder 17 is supported and on the lower side of which the second lifting cylinder 18 is fastened, while the lifting rod 28 of the lifting cylinder 18 transports the first shoulder 26. The third runner 23 is also provided on top with a similar second shoulder 30, which is arranged offset in relation to the first shoulder 26 by 90°, however. The lifting rod 28 is in turn supported against this second shoulder 30 and the lifting rod 29 of the lifting cylinder 19 transports the second shoulder 30. The internal runner or vertical telescope 16 is constructed similarly to the internal runner or vertical telescope 15, but mirror-symmetrically thereto.

The carrier head 7 is L-shaped having a carrier plate 34 overhanging the support 6 and consists of two identical parts 35 and 36, which comprise an essentially trapezoidal basis and are manufactured in solid form from a metal, preferably steel. The two parts 35 and 36 are extended downwardly on the left side shown in the figures by the trapezoidal carrier plate 34 and are connected to one another in the region of the carrier plate 34 by a cross tube or torsion tube 37. Above the cross tube 37, the pivot axis 38 of the boom 8 is arranged, and below the cross tube 37, an axis 39 is provided between the parts 35 and 36, which is used to support the pivot cylinder 12.

The platform 5 consists of two circular disks 40 and 41, which are connected to one another with spacing by a ring-shaped jacket 42. The lower fixed tube 21 penetrates the upper disk 40 and stands with its lower end on the lower disk 41. This metallic fixed tube 21 is welded on the circumference at the through borehole on the upper disk 40 and at the lower end on the lower disk 41. A very stable and torsionally-rigid connection is thus ensured between the support 4 and the platform 5.

The internal runners 15 and 16 are produced from a structural steel or fine-grained steel having the designation ST37 to ST52 and Domex 700 having a permissible tension of 420 N/mm$^2$ to 1200 N/mm$^2$, and have a material thickness of 4 to 10 mm. The internal runners 15 and 16 furthermore have a hexagonal footprint having two parallel longer sides than the other sides. It is obvious that other footprints are also suitable for the stability of the support 6. For example, a rectangular or pentagonal footprint could be provided. However, it has been shown that the hexagonal footprint has a particularly high torsional stability.

As shown in FIG. 7, the rotating platform 5 is screwed by means of an externally-toothed slewing ring 43 onto a support chassis 44. The support chassis 44 is mounted behind the cab 2 on the chassis of the heavy goods vehicle 1. The rotational axis of the slewing ring 43 is operated via a pinion and a planetary gearing motor having incremental encoder. The setting of the rotational axis is therefore freely programmable from 0° to 360° using an electronic controller.

The two internal runners or vertical telescopes 15 and 16 are equipped with a distance measuring system having a resolution of 0.5 mm. Therefore, any vertical point (ordinate) can be freely programmed and approached by means of the electronic controller.

The boom 8, which consists of multiple telescopically extensible runners, is also equipped with a similar distance measuring system having a resolution of 0.5 mm. Therefore, any horizontal point (abscissa) can be freely programmed and approached by means of the electronic controller.

Figure 11:
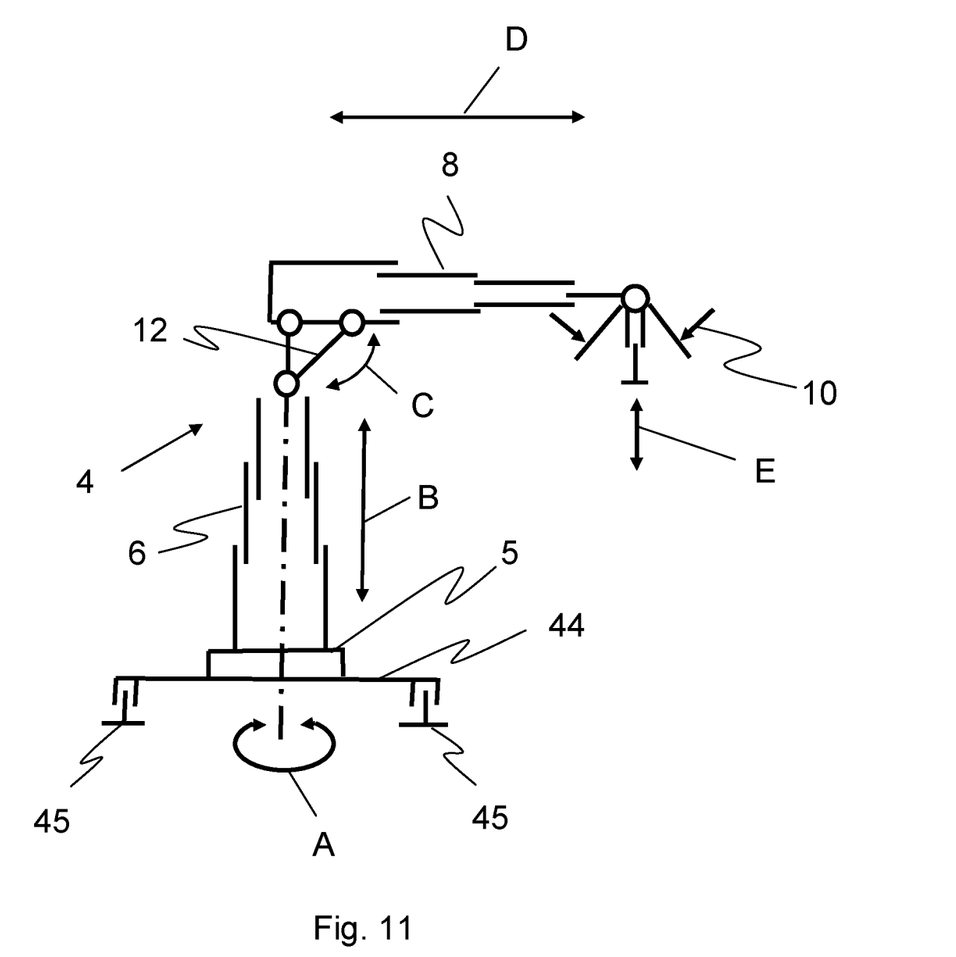
FIG. 11 shows a functional illustration of the lifting device.

The functions of the lifting device or crane 4 are shown in FIG. 11. The platform 5 on the support chassis 44 is freely rotatable about the rotational axis A to an arbitrary angle between 0° and 360°. The telescopically extensible support 6 can be shortened or lengthened along the vertical direction B. The pivot cylinder 12 is movable in a direction C in an acute angle in relation to the horizontal. Because the pivot cylinder 12 is fastened at its ends on the support 6 and on the boom 8, the acute angle changes in the event of a longer stroke. The telescopically extensible boom 8 is movable in the horizontal direction D, wherein this direction D can form a larger or smaller acute angle in relation to the horizontal as a function of the stroke of the pivot cylinder 12. Finally, there is a movement in the vertical direction E in the case of the coupling tool 10. The lifting device or the crane 4 is therefore a robot having five degrees of freedom A to E, which may guide the coupling tool 10 to any arbitrary location within the action radius of the crane 4 by means of the programmable electronic controller.

Figure 12:
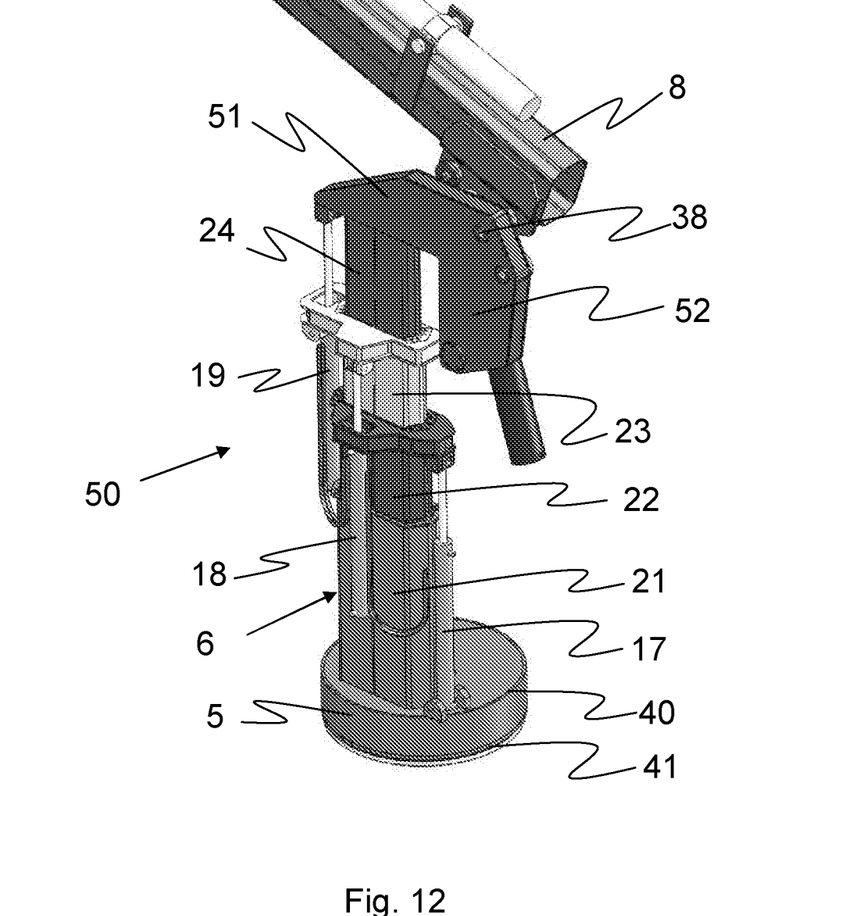
FIG. 12 shows a second, simplified embodiment of the crane in a perspective view.

FIG. 12 shows a second embodiment of the crane 50 having a single telescopically extensible support 6, which also consists here of an internal runner 16 having a fixed tube 21 and three runners 22, 23, and 24 which are telescopically displaceable one inside another. The carrier head 51 is formed L-shaped and is provided with a carrier plate 52 overhanging on one side in relation to the support 6. The carrier head 51 is welded on the head of the upper runner 24. The boom 8 is provided with the pivot axis 38 on top on the carrier plate 52.

Figure 13:
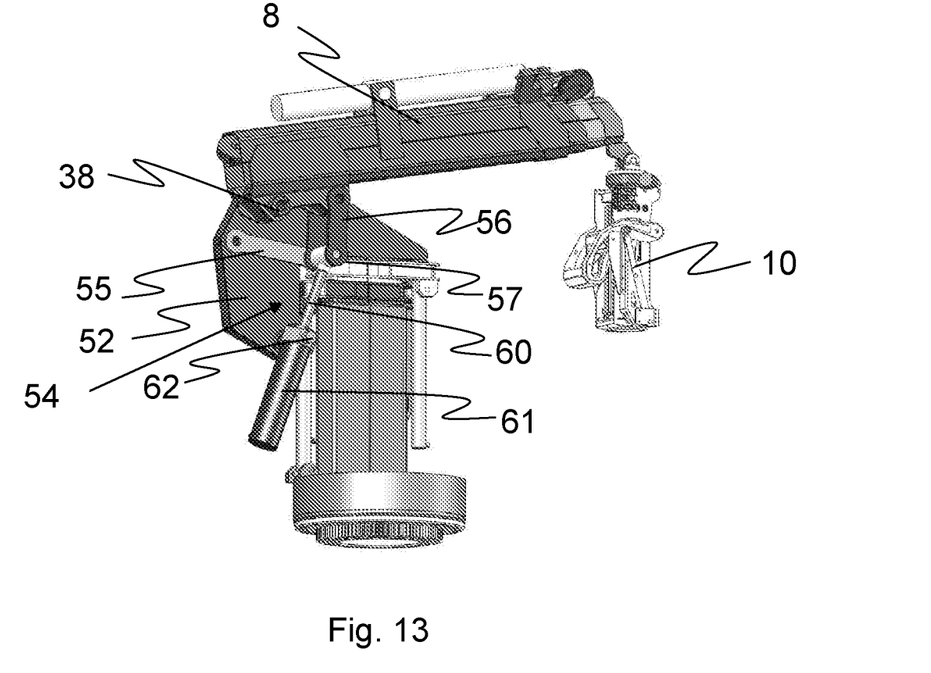
FIG. 13 shows the same crane as in FIG. 12 from the opposite side in a raised position.
Figure 14:
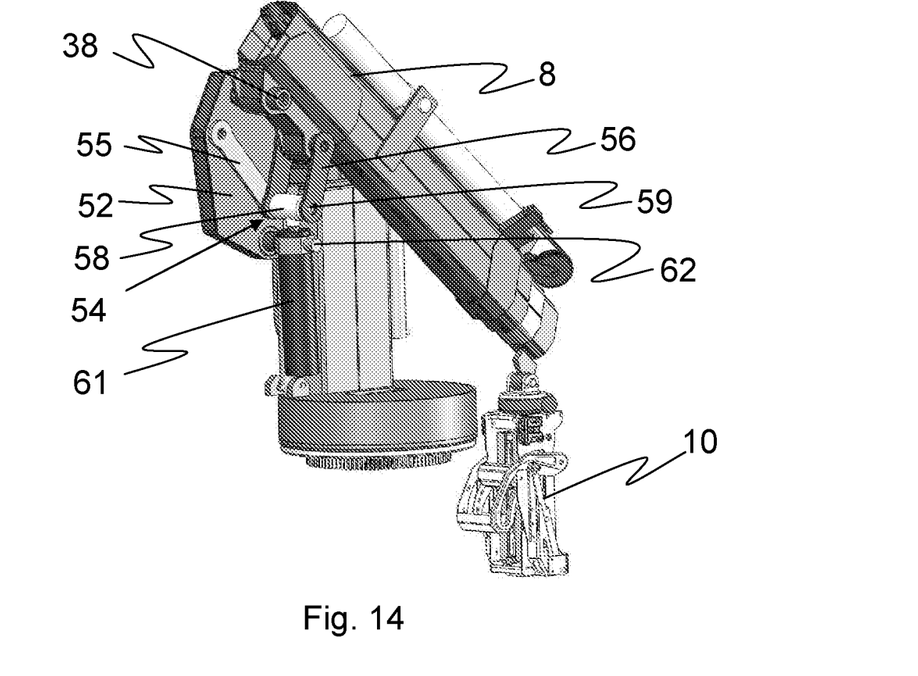
FIG. 14 shows the same crane as in FIG. 13 in a lowered position.

As is apparent from FIGS. 13 and 14, a knee lever mechanism 54 is arranged below the pivot axis 38, which consists of a plate-shaped lower leg 55, two plate-shaped upper legs 56, and a knee part 57. The knee part 57 has a tube 58 and a pin 59, which is freely rotationally movable inside the tube 58. The tube 58 is fastened between the lower ends of the two upper legs 56 and the pin 59 is fastened on the upper end of the lower leg 55. A piston rod 60 of a pressure cylinder 61, which is linked with a rotational axis 62 on the carrier plate 52, engages on the tube 58. The rotational axis 62 is arranged vertically below the pivot axis 38.

Figure 15:
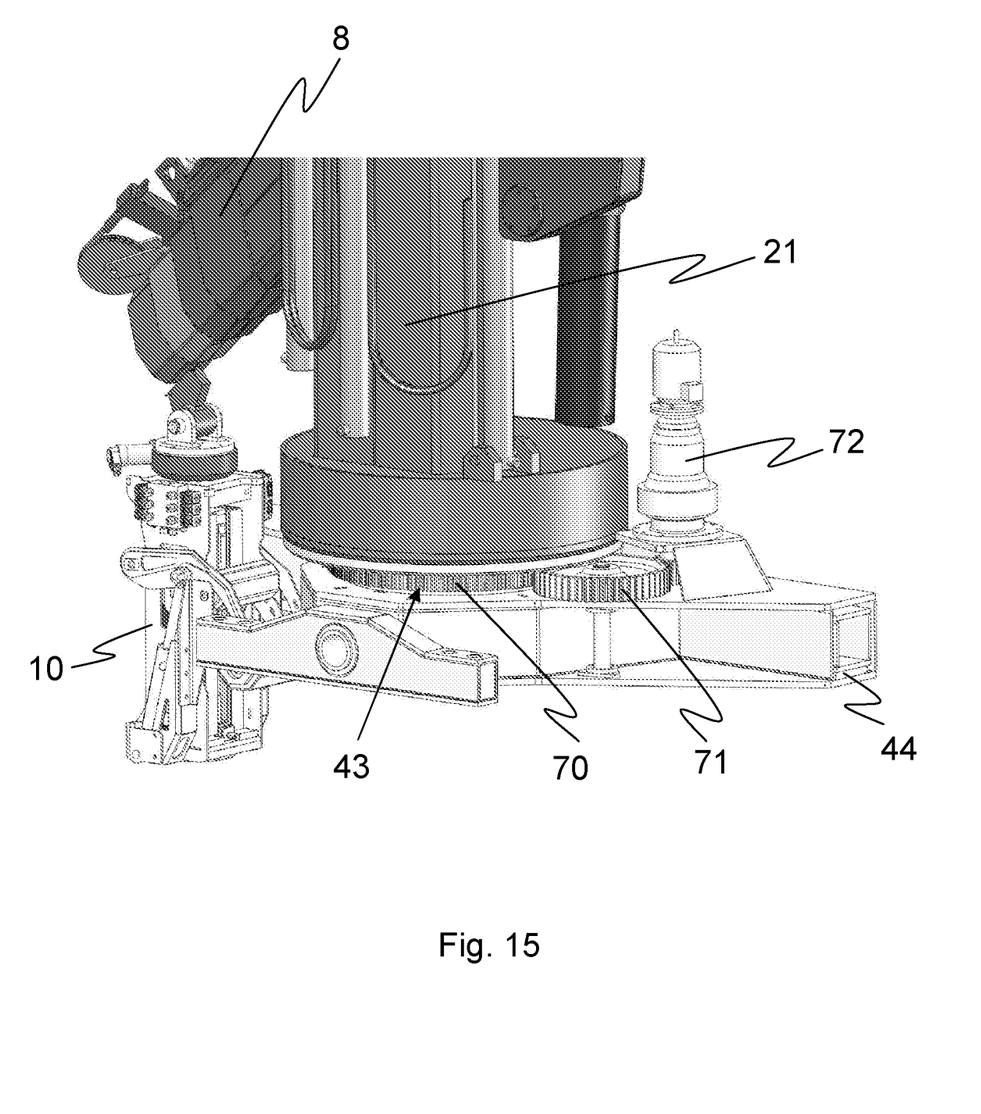
FIG. 15 shows a detail illustration of the drive of the rotating platform of the crane.

FIG. 15 is a perspective detail illustration of the second embodiment of the crane 50 in the lower region. The slewing ring 43 is provided with external teeth 70, in which a pinion 71 engages, which is driven on the other side by a planetary gearing motor 72 having an incremental encoder (not shown). Very slight rotations of the slewing ring 43 may therefore be caused.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A lifting device on a heavy goods vehicle for lifting and emptying waste collection containers, the lifting device comprising:
    a telescopically extensible boom, which has a coupling tool for coupling to a waste collection container; and
    a vertically extensible support, which is attached on a rotating platform, having at least one interleaved, telescopically extensible profile,
    wherein the boom is provided at an upper end region of the support with a pivot element between the boom and the support, wherein the pivot element is movable in a direction in an acute angle in relation to horizontal, so that the boom is pivotable in a vertical plane about a pivot axis,
    wherein the rotating platform is freely rotatable about a rotation axis to an arbitrary angle between 0° and 360°, wherein the extensible profile of the support is formed as a plurality of runners, wherein each of said runners comprises a rigid tube and has a polygonal footprint, and wherein a carrier head is provided at the upper end region of the support, which is L-shaped, wherein a longer side of the L-shaped carrier head is extending generally perpendicular to the vertically extensible support and is fastened to the upper end region of the support, and a shorter side of the L-shaped carrier is extending downward generally parallel to the vertically extensible support and has a free end which forms a carrier plate, which carrier plate overhangs the support and provides the pivot axis of the boom and a support element for the pivot element.

2. The lifting device according to claim 1, wherein the pivot element is designed as a pivot cylinder or as a knee lever mechanism.

3. The lifting device according to claim 1, wherein the carrier head comprises two identical, parallel parts, which are connected to one another by a cross tube.

4. The lifting device according to claim 3, wherein each of the parts of the carrier head comprise an essentially trapezoidal basis which is extended downwardly by the carrier plate, whereas the carrier plate has a trapezoidal form, which parts of the carrier head are manufactured in solid form from metal, wherein a longer side of each part is fastened on the upper end region of the support and the cross tube is provided laterally between the carrier plates of the parts.

5. The lifting device according to claim 3, wherein the pivot axis of the boom is attached above the cross tube and the pivot element is attached on an axis below the cross tube.

6. The lifting device according to claim 1, wherein the runners are produced from steel having a material thickness of 4 to 10 mm.

7. The lifting device according to claim 6, wherein the runners have a hexagonal footprint, which has two parallel sides longer than the other sides.

8. The lifting device according to claim 1, wherein the rotating platform has an upper disk and a lower disk spaced apart therefrom, and the fixed tube is fastened both on the upper disk and also on the lower disk.

9. The lifting device according to claim 1, wherein a protruding shoulder is provided on an upper end of one of the runners, wherein a lifting cylinder is fastened to the protruding shoulder at a first location, and wherein a lifting rod of a lower lifting cylinder engages the protruding shoulder at a second location different from the first location.

10. The lifting device according to claim 1, wherein a programmable controller is provided to control the movements of the support, the boom, and the coupling tool in coordination.

* * * * *